US011665605B2

(12) United States Patent
Feki et al.

(10) Patent No.: US 11,665,605 B2
(45) Date of Patent: May 30, 2023

(54) MACHINE LEARNING BASED HANDOVER PARAMETER OPTIMIZATION

(71) Applicant: NOKIA SOLUTIONS AND NETWORKS OY, Espoo (FI)

(72) Inventors: Afef Feki, Sceaux (FR); Wael Motamed, Massy (FR); Veronique Capdevielle, Magny les Hameaux (FR); Jean-Michel Pugeat, Paris (FR); Claudiu Mihailescu, Versailles (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 84 days.

(21) Appl. No.: 17/188,264

(22) Filed: Mar. 1, 2021

(65) Prior Publication Data

US 2021/0289406 A1 Sep. 16, 2021

(30) Foreign Application Priority Data

Mar. 4, 2020 (FI) ...................................... 20205232

(51) Int. Cl.
*H04W 36/00* (2009.01)
*G06N 20/00* (2019.01)
*H04W 36/24* (2009.01)

(52) U.S. Cl.
CPC ........ *H04W 36/0094* (2013.01); *G06N 20/00* (2019.01); *H04W 36/00837* (2018.08); *H04W 36/245* (2013.01)

(58) Field of Classification Search
CPC ....... H04W 36/0094; H04W 36/00837; H04W 36/245; H04W 36/0085; G06N 20/00
See application file for complete search history.

(56) References Cited

U.S. PATENT DOCUMENTS 9,516,565 B2 * 12/2016 Ding ............... H04W 36/00835
9,986,488 B2 *  5/2018 Shim ............... H04W 36/00835
(Continued)

FOREIGN PATENT DOCUMENTS

EP          2723123 A1    4/2014
WO    WO 2019/172813 A1   9/2019

OTHER PUBLICATIONS

Office Action and Search Report dated Jun. 23, 2020 corresponding to Finnish Patent Application No. 20205232.
(Continued)

*Primary Examiner* — Chandrahas B Patel
(74) *Attorney, Agent, or Firm* — Squire Patton Boggs (US) LLP

(57) ABSTRACT

Disclosed is a method comprising obtaining a plurality of handover parameter values, using a first machine learning model to select a subset of handover parameter values from the plurality of handover parameter values, obtaining historical information of a plurality of terminal devices, determining a first set of optimal handover parameter values for the plurality of terminal devices from the subset of handover parameter values, tagging the first set of optimal handover parameter values with the historical information of the plurality of terminal devices to obtain a labelled dataset, and training a second machine learning model with the labelled dataset, wherein the trained second machine learning model is capable of predicting a second set of optimal handover parameter values for a first terminal device based on historical information of the first terminal device.

20 Claims, 16 Drawing Sheets

(56) References Cited

U.S. PATENT DOCUMENTS

| | | | |
|---|---|---|---|
| 10,064,199 B2* | 8/2018 | Bhattacharya | H04W 72/042 |
| 10,341,916 B2* | 7/2019 | Futaki | H04W 36/08 |
| 2014/0254550 A1 | 9/2014 | Salvador et al. | |
| 2020/0015318 A1 | 1/2020 | Garg et al. | |

OTHER PUBLICATIONS

A. Klein et al., "Fuzzy Q-Learning for Mobility Robustness Optimization in Wireless Networks," In: IEEE Globecom Workshops (GC Wkshps), Atlanta, GA, USA, IEEE, Dec. 2013.

Y. Sun et al., "Application of Machine Learning in Wireless Networks: Key Techniques and Open Issues," In: IEEE Communications Surveys & Tutorials, IEEE, Jun. 2019, vol. 21, No. 4, pp. 3072-3108.

Extended European Search Report dated Jul. 23, 2021 corresponding to European Patent Application No. 21159289.4.

Sihua Shao et al., "Optimizing Handover Parameters by Q-Learning for Heterogeneous Radio-Optical Networks," IEEE Photonics Journal, IEEE, vol. 12, No. 1, Nov. 15, 2019, pp. 1-15, XP011766908.

Le Luong Vy et al., "Big Data and Machine Learning Driven Handover Management and Forecasting," 2017 IEEE Conference on Standards for Communications and Networking (CSCN), IEEE, Sep. 18, 2017, pp. 214-219, XP033241344.

Savita Kumari et al., "Data-driven handover optimization in small cell networks," Wireless Networks, ACM, vol. 25, No. 8, Aug. 8, 2019, pp. 5001-5009, XP036924862.

* cited by examiner

MACHINE LEARNING BASED HANDOVER PARAMETER OPTIMIZATION

FIELD

The following exemplary embodiments relate to reliability of connectivity in a cellular communication network.

BACKGROUND

As resources are limited, it is desirable to optimize the usage of network resources. A cell in a cellular communication network may be utilized such that better service may be provided to one or more terminal devices. The optimization of the usage of one or more cells may therefore enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising means for obtaining a plurality of handover parameter values, using a first machine learning model to select a subset of handover parameter values from the plurality of handover parameter values, obtaining historical information of a plurality of terminal devices, determining a first set of optimal handover parameter values for the plurality of terminal devices from the subset of handover parameter values, tagging the first set of optimal handover parameter values with the historical information of the plurality of terminal devices to obtain a labelled dataset, and training a second machine learning model with the labelled dataset, wherein the trained second machine learning model is capable of predicting a second set of optimal handover parameter values for a first terminal device based on historical information of the first terminal device.

According to another aspect, there is provided an apparatus comprising at least one processor, and at least one memory including computer program code, wherein the at least one memory and the computer program code are configured, with the at least one processor, to cause the apparatus to: obtain a plurality of handover parameter values, use a first machine learning model to select a subset of handover parameter values from the plurality of handover parameter values, obtain historical information of a plurality of terminal devices, determine a first set of optimal handover parameter values for the plurality of terminal devices from the subset of handover parameter values, tag the first set of optimal handover parameter values with the historical information of the plurality of terminal devices to obtain a labelled dataset, and train a second machine learning model with the labelled dataset, wherein the trained second machine learning model is capable of predicting a second set of optimal handover parameter values for a first terminal device based on historical information of the first terminal device.

According to another aspect, there is provided a system comprising one or more apparatuses, wherein the system is configured to: obtain a plurality of handover parameter values, use a first machine learning model to select a subset of handover parameter values from the plurality of handover parameter values, obtain historical information of a plurality of terminal devices, determine a first set of optimal handover parameter values for the plurality of terminal devices from the subset of handover parameter values, tag the first set of optimal handover parameter values with the historical information of the plurality of terminal devices to obtain a labelled dataset, and train a second machine learning model with the labelled dataset, wherein the trained second machine learning model is capable of predicting a second set of optimal handover parameter values for a first terminal device based on historical information of the first terminal device.

According to another aspect, there is provided a system comprising a self-organizing network, wherein the self-organizing network is configured to: obtain a plurality of handover parameter values, use a first machine learning model to select a subset of handover parameter values from the plurality of handover parameter values, obtain historical information of a plurality of terminal devices, determine a first set of optimal handover parameter values for the plurality of terminal devices from the subset of handover parameter values, tag the first set of optimal handover parameter values with the historical information of the plurality of terminal devices to obtain a labelled dataset, and train a second machine learning model with the labelled dataset, wherein the trained second machine learning model is capable of predicting a second set of optimal handover parameter values for a first terminal device based on historical information of the first terminal device.

According to another aspect, there is provided a system comprising a radio intelligent controller, wherein the radio intelligent controller is configured to: obtain a plurality of handover parameter values, use a first machine learning model to select a subset of handover parameter values from the plurality of handover parameter values, obtain historical information of a plurality of terminal devices, determine a first set of optimal handover parameter values for the plurality of terminal devices from the subset of handover parameter values, tag the first set of optimal handover parameter values with the historical information of the plurality of terminal devices to obtain a labelled dataset, and train a second machine learning model with the labelled dataset, wherein the trained second machine learning model is capable of predicting a second set of optimal handover parameter values for a first terminal device based on historical information of the first terminal device.

According to another aspect, there is provided a system comprising a centralized unit and a distributed unit, wherein the centralized unit is configured to: obtain a plurality of handover parameter values, use a first machine learning model to select a subset of handover parameter values from the plurality of handover parameter values, obtain historical information of a plurality of terminal devices from the distributed unit, determine a first set of optimal handover parameter values for the plurality of terminal devices from the subset of handover parameter values, tag the first set of optimal handover parameter values with the historical information of the plurality of terminal devices to obtain a labelled dataset, and train a second machine learning model with the labelled dataset, wherein the trained second machine learning model is capable of predicting a second set of optimal handover parameter values for a first terminal device based on historical information of the first terminal device.

According to another aspect, there is provided a method comprising obtaining a plurality of handover parameter values, using a first machine learning model to select a subset of handover parameter values from the plurality of handover parameter values, obtaining historical information of a plurality of terminal devices, determining a first set of optimal handover parameter values for the plurality of terminal devices from the subset of handover parameter values, tagging the first set of optimal handover parameter values with the historical information of the plurality of terminal devices to obtain a labelled dataset, and training a second machine learning model with the labelled dataset, wherein the trained second machine learning model is capable of predicting a second set of optimal handover parameter values for a first terminal device based on historical information of the first terminal device.

According to another aspect, there is provided a computer program comprising instructions for causing an apparatus to perform at least the following: obtain a plurality of handover parameter values, use a first machine learning model to select a subset of handover parameter values from the plurality of handover parameter values, obtain historical information of a plurality of terminal devices, determine a first set of optimal handover parameter values for the plurality of terminal devices from the subset of handover parameter values, tag the first set of optimal handover parameter values with the historical information of the plurality of terminal devices to obtain a labelled dataset, and train a second machine learning model with the labelled dataset, wherein the trained second machine learning model is capable of predicting a second set of optimal handover parameter values for a first terminal device based on historical information of the first terminal device.

According to another aspect, there is provided a computer readable medium comprising program instructions for causing an apparatus to perform at least the following: obtain a plurality of handover parameter values, use a first machine learning model to select a subset of handover parameter values from the plurality of handover parameter values, obtain historical information of a plurality of terminal devices, determine a first set of optimal handover parameter values for the plurality of terminal devices from the subset of handover parameter values, tag the first set of optimal handover parameter values with the historical information of the plurality of terminal devices to obtain a labelled dataset, and train a second machine learning model with the labelled dataset, wherein the trained second machine learning model is capable of predicting a second set of optimal handover parameter values for a first terminal device based on historical information of the first terminal device.

According to another aspect, there is provided a non-transitory computer readable medium comprising program instructions for causing an apparatus to perform at least the following: obtain a plurality of handover parameter values, use a first machine learning model to select a subset of handover parameter values from the plurality of handover parameter values, obtain historical information of a plurality of terminal devices, determine a first set of optimal handover parameter values for the plurality of terminal devices from the subset of handover parameter values, tag the first set of optimal handover parameter values with the historical information of the plurality of terminal devices to obtain a labelled dataset, and train a second machine learning model with the labelled dataset, wherein the trained second machine learning model is capable of predicting a second set of optimal handover parameter values for a first terminal device based on historical information of the first terminal device.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture. However, it is obvious for a person skilled in the art that the exemplary embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
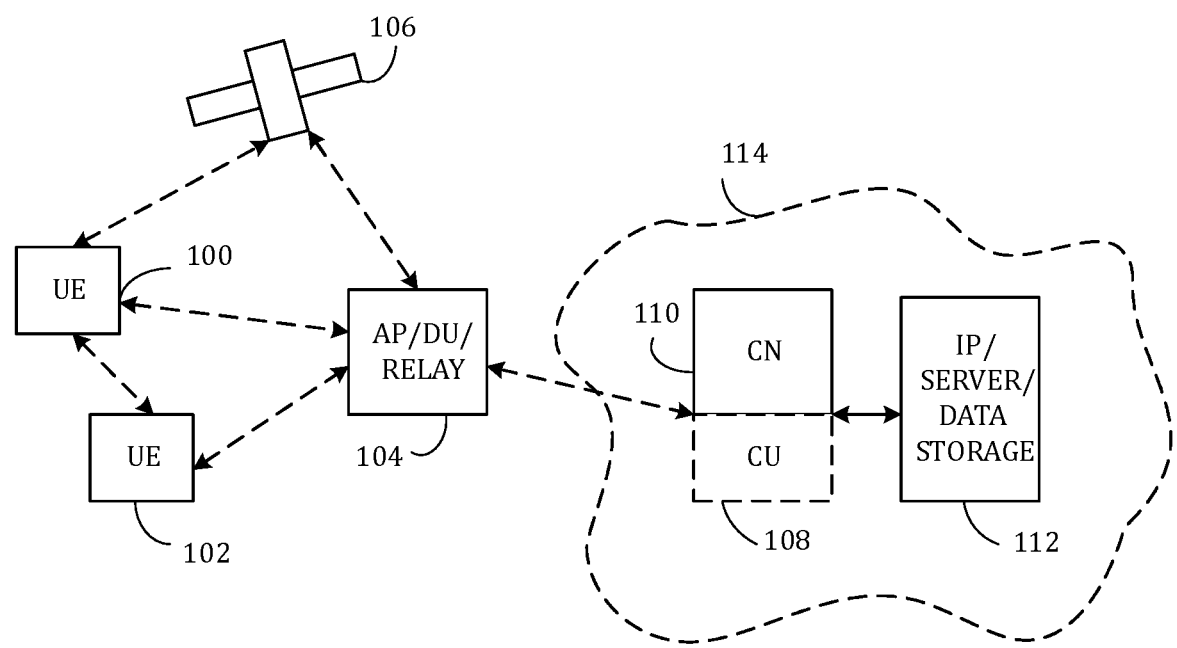
FIG. 1 illustrates an exemplary embodiment of a cellular communication network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some exemplary embodiments a layer 3 relay node) is configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

To provide a continuous service for a user of a terminal device, the terminal device may carry out a handover process, which may also be referred to as handoff, to change from one channel or bearer service to another. This change of channel may also cause the change of a base station or another network element, such as a network element controlling a base station or a core network element, for example a mobile switching center or a support node of packet-switched services. For example, when a terminal device with an ongoing call or data session is moving away from an area covered by a first cell and entering an area covered by a second cell, the session may be handed over from the base station of the first cell to the base station of the second cell in order to avoid terminating or disrupting the session, when the terminal device gets outside the range of the first cell. It should be noted that handover may even occur to another kind of system, which may be referred to as inter-system handover, for example between a GSM network and third generation partnership project, 3GPP, UMTS network and/or WLAN.

Thus, there may be multiple alternative access services and alternative handover parameter settings available, and the terminal device may decide which of the available network connections should be established to replace the original connection. The terminal device may continuously measure the signal quality of the serving base station and neighboring base stations, and report these measurements to the base stations. A handover algorithm may then decide on handover based on the signal quality and/or other quality information of the available radio access channels. In other words, the handover algorithm may select the radio access channel with the best quality. The connection settings associated with the radio access node, for example a base station, selected by the handover algorithm may then be used to establish the new connection. However, it is desirable that the handover process occurs in optimal conditions with minimum failure ratio. The handover process may rely on different handover parameters, for example hysteresis margin, denoted herein as M, and/or time-to-trigger, denoted herein as TTT, which may impact handover performance. Thus, the handover performance may be improved by optimizing the handover parameter values.

Figure 2:
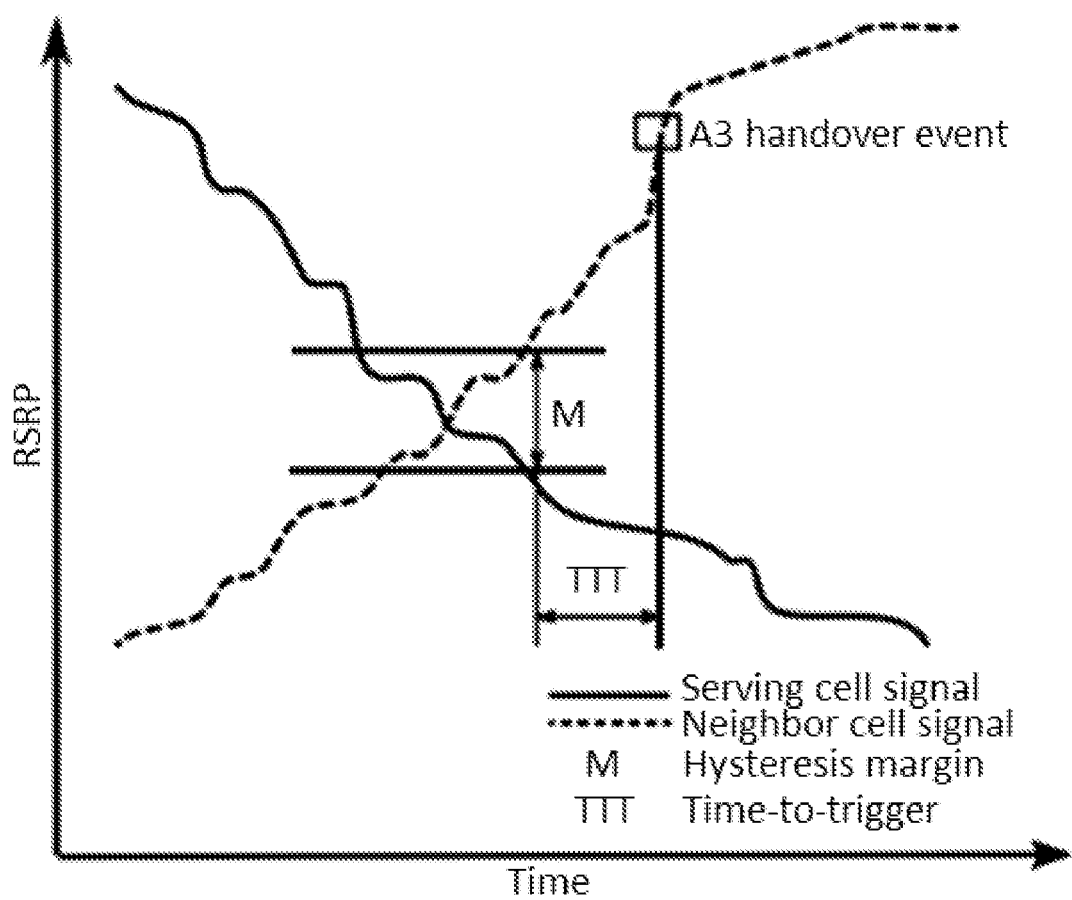
FIG. 2 illustrates an example of a handover event.

FIG. 2 illustrates an example of a handover event, in particular an A3 handover event. For example, when the reference signal received power, RSRP, of the serving cell decreases below an acceptable level, and the RSRP of the neighbor cell becomes higher than the RSRP of the serving cell by a threshold value indicated by the hysteresis margin, a handover may be initiated by the base station of the serving cell after a time interval indicated by the TTT.

Hysteresis margin may be applied to avoid triggering unnecessary events caused by rapid fluctuations of the cell's measured quality. The hysteresis margin may define the entry condition to initiate the handover, when the RSRP measure of a neighbor cell is above the RSRP of the serving cell plus a threshold represented by A3 offset and hysteresis margin:

$$RSRP_N > RSRP_S + A3_{offset} + M$$

where $RSRP_N$ is the RSRP measure of the neighbor cell, $RSRP_S$ is the RSRP measure of the serving cell, $A3_{offset}$ is the A3 offset, and M is the hysteresis margin value.

TTT may be used to set a predefined time interval, during which the entry condition needs to be satisfied in order to execute the handover. The use of TTT may decrease the number of unnecessary handovers and especially ping-pong events, i.e. when the terminal device performs a handover and then directly reconnects back to the source cell. However, it should be noted that TTT may also cause a delay in handover, which may impact the number of handover failures.

Setting the handover parameter values manually by an operator may be time-consuming, error-prone and inefficient. For example, if the network environment changes, the handover parameter values may no longer be suitable and this may lead to an increase in handover failure and/or radio link failure, RLF. Therefore, mobility robustness optimization, MRO, may be introduced into a self-organizing network, SON, to detect RLFs caused by too early handovers, too late handovers, and/or handovers to incorrect cells. A SON may be defined as a system for automatic configuration, optimization and healing of a radio access network. MRO may be defined as a technique for automatic detection and correction of errors in a mobility configuration. MRO may be used to dynamically improve the network performance of handovers in order to provide improved end-user experience and/or increased network capacity.

Furthermore, there may be a relationship between the optimal handover parameter values and the speed of the terminal device, i.e. the physical quantity of speed that the terminal device is physically moving at. For example, for terminal devices moving at high speed it may be beneficial to decrease the TTT value, since a long waiting time may lead to a call drop. The optimal handover parameter values may be selected for example from a look-up table comprising optimal handover parameter values as a function of the speed of the terminal device, but this may require an estimation of the speed of the terminal device. Therefore, an error in the estimated speed may lead to inappropriate handover parameter values, resulting in reduced handover performance.

Figure 3:
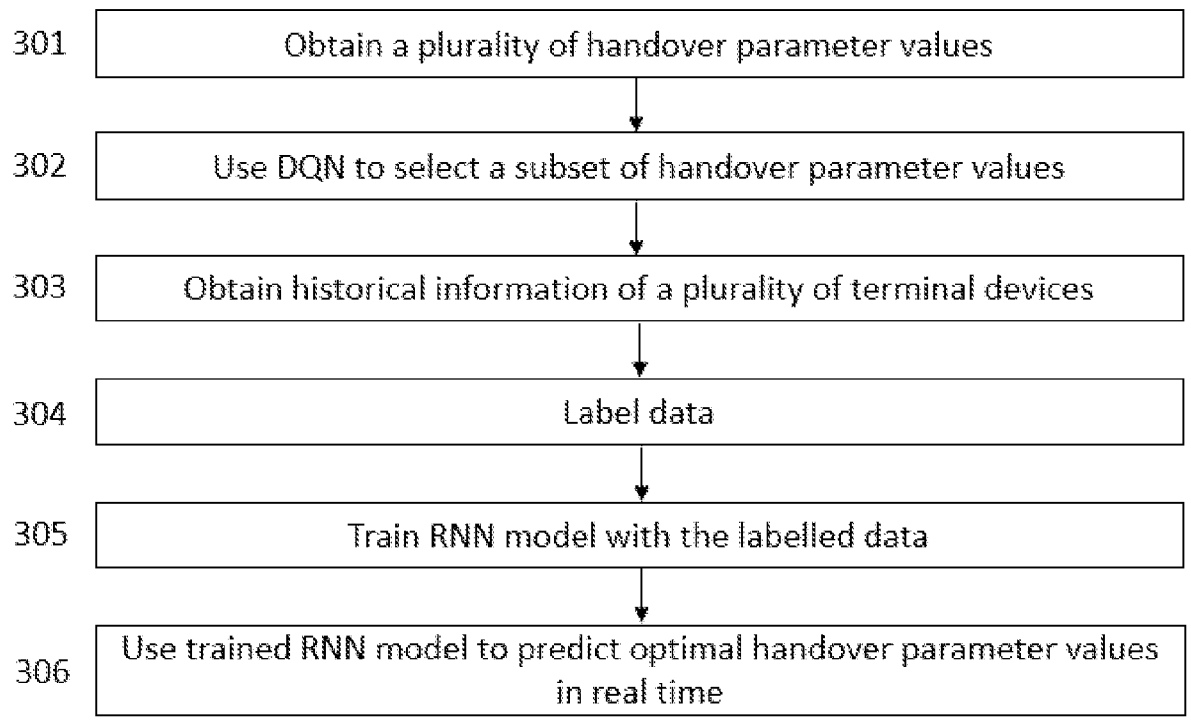
FIG. 3 illustrates a flow chart according to an exemplary embodiment.

Various exemplary embodiments may be used to automatically optimize handover parameter values without requiring explicit information on the speed of the terminal device. FIG. 3 illustrates a flow chart according to an exemplary embodiment. In step 301, a plurality of candidate handover parameter values is obtained, or received, as input. The plurality of candidate handover parameter values may represent the total set of possible handover parameter configurations. For example, the plurality of candidate handover parameter values may be received from the RAN, set up in a standard, and/or selected by an operator.

In step 302, a subset of handover parameter values is selected from the plurality of candidate handover parameter values in order to reduce the number of handover parameter values. The subset of handover parameter values may represent a set of handover parameter values that are relevant in the considered context, for example corresponding to a given profile of terminal devices in the considered cell or group of cells. For example, TTT values may be preselected for terminal devices moving at high speed. A first machine learning model based on reinforcement learning, for example a deep Q-learning network, DQN, may be used to adapt to the environment and select the subset of handover parameter values from the plurality of candidate handover parameter values.

Reinforcement learning may be defined as an area of machine learning that may be used to determine what actions a software agent, for example an algorithm, should take in an environment in order to maximize a reward. Herein a reward may be defined as feedback measuring the success or failure of the actions taken by the software agent. Q-learning is a reinforcement learning algorithm, which may be used to determine what actions to take without requiring a model of the environment. A deep Q-learning network may comprise a deep neural network, DNN, i.e. an artificial neural network with a plurality of layers between the input and output layers.

In step 303, historical information of a plurality of terminal devices is obtained for example from one or more base stations. The historical information may comprise for example a cell ID of a cell that the terminal device has been served by, a beam ID of a beam that the terminal device has been served by, and/or one or more measured RSRP values of the beam reported during a predefined time period.

In step 304, data labelling is performed in order to obtain a labelled dataset. In order to obtain the labelled dataset, a set of optimal handover parameter values for the plurality of terminal devices is determined from the subset of handover parameter values, and the optimal handover parameter values are tagged with the plurality of terminal devices represented by vectors of historical information, for example cell ID, beam ID and/or beam RSRP per terminal device. The set of optimal handover parameter values may be handover parameter values that are determined to maximize a key performance indicator of the plurality of terminal devices, and the optimal handover parameter values are then tagged with the historical information of the corresponding terminal device that they are optimal for. For example, MRO counters may be used as the key performance indicator. MRO counters may indicate the number of different MRO events, for example too early handovers, too late handovers, and/or handovers to incorrect cells.

The optimal handover parameter values may be determined by testing the subset of handover parameter values with at least a subset of the plurality of terminal devices and selecting a set of handover parameter values that maximize a performance indicator of the at least subset of the plurality of terminal devices. For example, the optimal handover parameter values for a given terminal device may be determined by testing the subset of handover parameter values for a part of the terminal device trajectory. The optimal handover parameter values, for example a pair of a TTT value and a hysteresis margin value, that maximize the performance of the terminal device may then be tagged with the historical information of that individual terminal device. The performance may be measured for example with MRO counters. For example, a cluster-based technique may be used, wherein a plurality of master terminal devices, i.e. a subset of the plurality of terminal devices, may be tested with the subset of handover parameters values in order to determine the optimal handover parameter values that maximize the performance of a given master terminal device. Then, for one or more other terminal devices, a similarity metric may be defined, for example based on the vector of successive received RSRP measurements, to identify to which class of master terminal devices a given other terminal device belongs. Then, the optimal handover parameter values may be attributed to the other terminal device as the ones determined for the master terminal device of the class.

Alternatively, the optimal handover parameter values may be determined for example by simulating the subset of handover parameter values with the plurality of terminal devices and selecting a set of handover parameter values that maximize a performance indicator of the plurality of terminal devices based on the simulation. For example, the same trajectory of a given terminal device may be repeated with the subset of handover parameter values in a simulation in order to determine the optimal handover parameter values that maximize the performance of that individual terminal device based on the simulation. The performance may be measured for example with MRO counters.

In step 305, the labelled dataset is provided as training data to a second machine learning model in order to train the second machine learning model with the training data. The second machine learning model may be based for example on supervised learning. For example, the second machine learning model may be a recurrent neural network, RNN, model, such as a many-to-one multivariate long-short term memory, LSTM, model.

Supervised learning is an area of machine learning that may be used for learning a function that maps an input to an output based on exemplary input-output pairs. An RNN is an artificial neural network that may take sequential input, for example time series information, and provide as output optimal handover parameter values by sharing parameters between time steps. Consequently, the RNN may remember the historical information, and the decisions may be influenced by what is learnt from the past. It should be noted that the output of the RNN may depend not only on the input values, but it may depend also on the ordering of elements in the input sequence.

After the training is completed, in step 306 the trained second machine learning model may be provided, for example transmitted, to one or more base stations, which in turn may use the trained second machine learning model to predict optimal handover parameter values, for example a TTT value and a hysteresis margin value, for one or more terminal devices continuously in real time based on the historical information of the one or more terminal devices. Consequently, the predicted optimal handover parameter values may be used to improve the reliability of connectivity for the one or more terminal devices. It should be noted that the one or more terminal devices, for which the optimal handover parameter values may be predicted by the second machine learning model, may be different terminal device(s) than the plurality of terminal devices that are used to train the second machine learning model.

Figure 4:
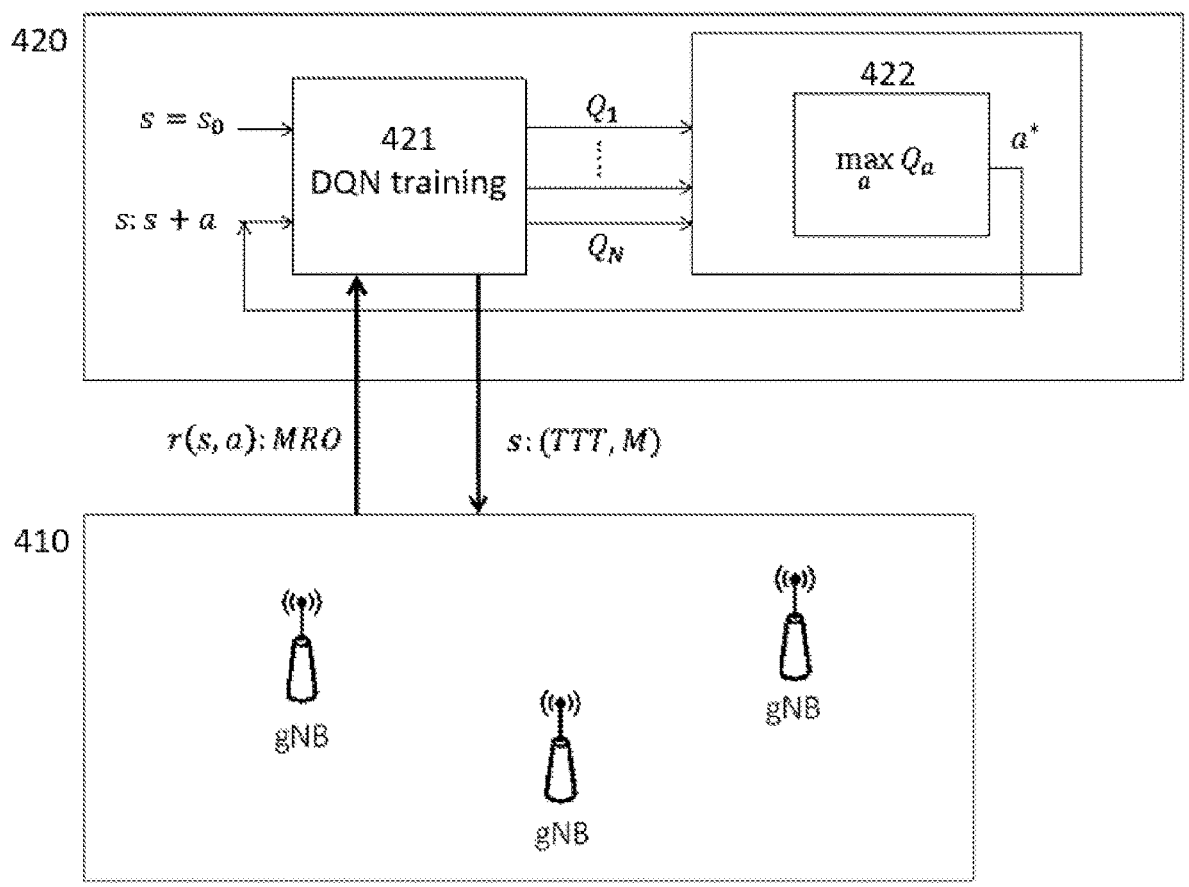
FIG. 4 illustrates an exemplary embodiment utilizing deep Q-learning.

FIG. 4 illustrates an exemplary embodiment utilizing deep Q-learning, wherein a DQN is trained in order to select the subset of handover parameter values from the plurality of candidate handover parameter values. The DQN-based machine learning may be performed outside of a RAN 410 in an external platform 420. The external platform 420 may be for example a system such as a SON or a radio intelligent controller, RIC. In the exemplary embodiment, a software agent, for example an algorithm, may learn to adapt to a particular environment by performing actions and analyzing the resulting performances. The software agent may be described by a specific state, denoted herein as s, and the software agent may interact with the environment by performing different actions, denoted herein as a, wherein the actions may be characterized by a reward, denoted herein as r. In other words, state-action pairs may be mapped to expected rewards. A state may comprise for example a pair of a TTT value and a hysteresis margin value from the plurality of candidate handover parameter values. An example of an action is to increase or decrease the TTT value and/or hysteresis margin value, thus resulting in a new state. A DQN training function 421 may be used for training the DQN. The DQN training function may exchange information with the RAN to inform a base station, for example a gNB, on the selected state s, and afterwards to obtain the corresponding reward value r(s, a), measured for example with MRO counters. The DQN training function may provide as output a plurality of Q-values associated with a plurality of actions. A Q-value may indicate a total long-term reward associated with an action, whereas r may indicate an immediate reward associated with an action. A deterministic function 422 may be used to select the action with the highest Q-value from the output of the DQN training function. The goal of the software agent may be to maximize the total reward.

In an exemplary embodiment, for example 5 different TTT values and 9 different hysteresis margin values for each of the TTT values may be considered as initial values. Thus, there may be 45 possible states in this exemplary embodiment, as depicted in Table 1 below.

TABLE 1

|  | M = 1 dB | M = 2 dB | M = 3 dB | M = 4 dB | M = 5 dB | M = 6 dB | M = 7 dB | M = 8 dB | M = 9 dB |
| --- | --- | --- | --- | --- | --- | --- | --- | --- | --- |
| TTT = 0.1 s | 1 | 2 | 3 | 4 | 5 | 6 | 7 | 8 | 9 |
| TTT = 0.48 s | 10 | 11 | 12 | 13 | 14 | 15 | 16 | 17 | 18 |
| TTT = 0.64 s | 19 | 20 | 21 | 22 | 23 | 24 | 25 | 26 | 27 |
| TTT = 1.28 s | 28 | 29 | 30 | 31 | 32 | 33 | 34 | 35 | 36 |
| TTT = 2.56 s | 37 | 38 | 39 | 40 | 41 | 42 | 43 | 44 | 45 |

The software agent may move from one state to another by choosing an action. In this exemplary embodiment, there may be 9 possible actions:
1. Single increase in TTT value
2. Single decrease in TTT value
3. Single increase in M value
4. Single decrease in M value
5. Single increase in TTT value and single increase in M value
6. Single decrease in TTT value and single decrease in M value
7. Single increase in TTT value and single decrease in M value
8. Single increase in M value and single decrease in TTT value
9. Stay at the current state In other words, it may be possible to move from the current state to a neighbor state as depicted in Table 1, or to stay at the current state. For example, from state 23 it may be possible to move to state 13, 14, 15, 22, 24, 31, 32 or 33, or to stay at state 23. A reward may be associated with an action for example based on the following function:

$$r(s,a) = \text{number of successful handovers} - \text{MRO counters}$$

During the DQN training, a concept called experience replay may be applied to store the experiences in order to help avoid forgetting previous experiences and to reduce correlations between experiences. In an exemplary embodiment, the following steps may be used to train the DQN:
1. Select a random state for one or more terminal devices
2. Collect MRO counters for the selected configuration, then compute the reward
3. Select an action a according to a greedy algorithm
4. Store the state, action, reward and next state in memory A greedy algorithm is a type of algorithm that may be used to determine an optimal action at a particular step in order to solve an optimization problem.

The above steps may be repeated until a dataset is constructed with the experience replay concept as follows:
1. Sample random mini batch from memory
2. Predict Q-values with respect to the old weights of the DQN
3. Update Q-value of action a according to:

$$Q(s,a) = r(s,a) + \gamma \times \max_{a_{next}} Q(s_{next}, a_{next})$$

4. Fit the DQN using the updated Q-value

The above equation denotes that the Q-value from being at state s and performing action a equals to the immediate reward $r(s, a)$ plus the highest Q-value from the next state $s_{next}$. In the above equation, $\gamma$ denotes a discount factor with a value between 0 and 1 controlling the contribution of future rewards. The training process may thus result in a mapping between states and actions.

Figure 5:
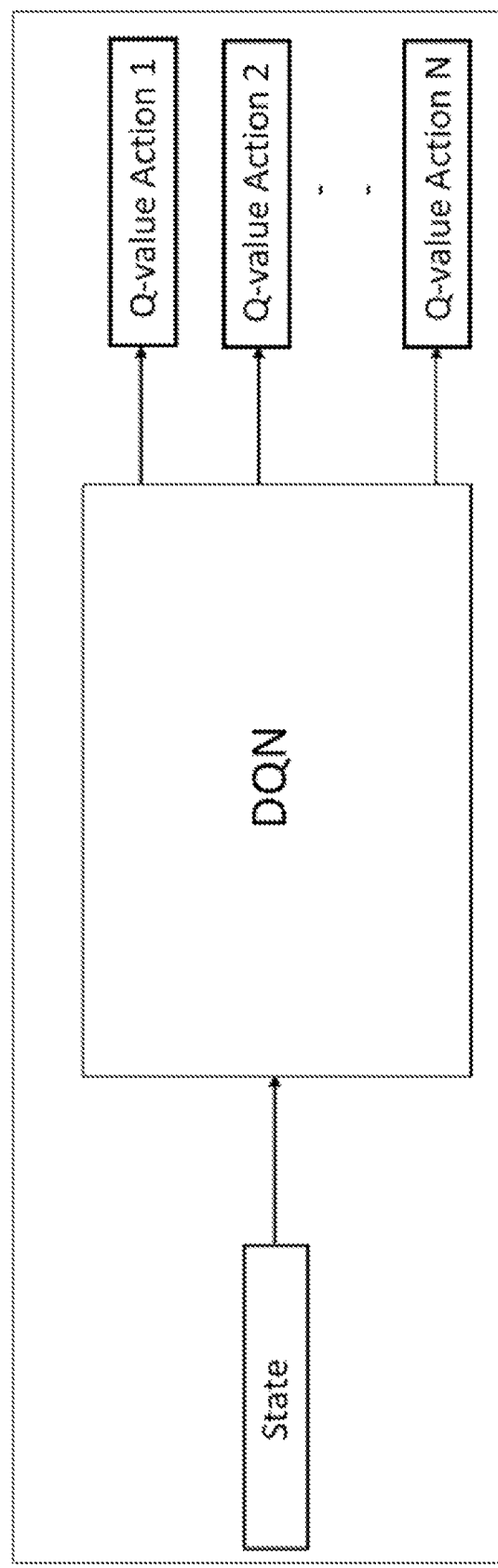
FIG. 5 illustrates a trained deep Q-learning network model according to an exemplary embodiment.

FIG. 5 illustrates an exemplary embodiment comprising a trained DQN model for predicting Q-values to select the subset of handover parameter values for the considered cell or group of cells from the plurality of candidate handover parameter values. A state, for example a pair of a TTT value and a hysteresis margin value, is provided as input to the DQN, and a plurality of Q-values for a plurality of actions is generated as output. The action with the highest Q-value may then be selected. As a result, it may be possible to converge to a smaller subset of states, i.e. to select the subset of handover parameter values, that maximize the defined reward function. In other words, the plurality of candidate handover parameter values is reduced to a smaller subset of handover parameter values that may represent the relevant handover parameter values for the considered cell or group of cells. The subset of handover parameter values selected by the DQN may then be provided to a data labelling function in order to identify which handover parameter values from the subset are optimal for which individual terminal device, and to obtain the historical information per terminal device in order to form the labelled dataset for training the RNN model.

Figure 6:
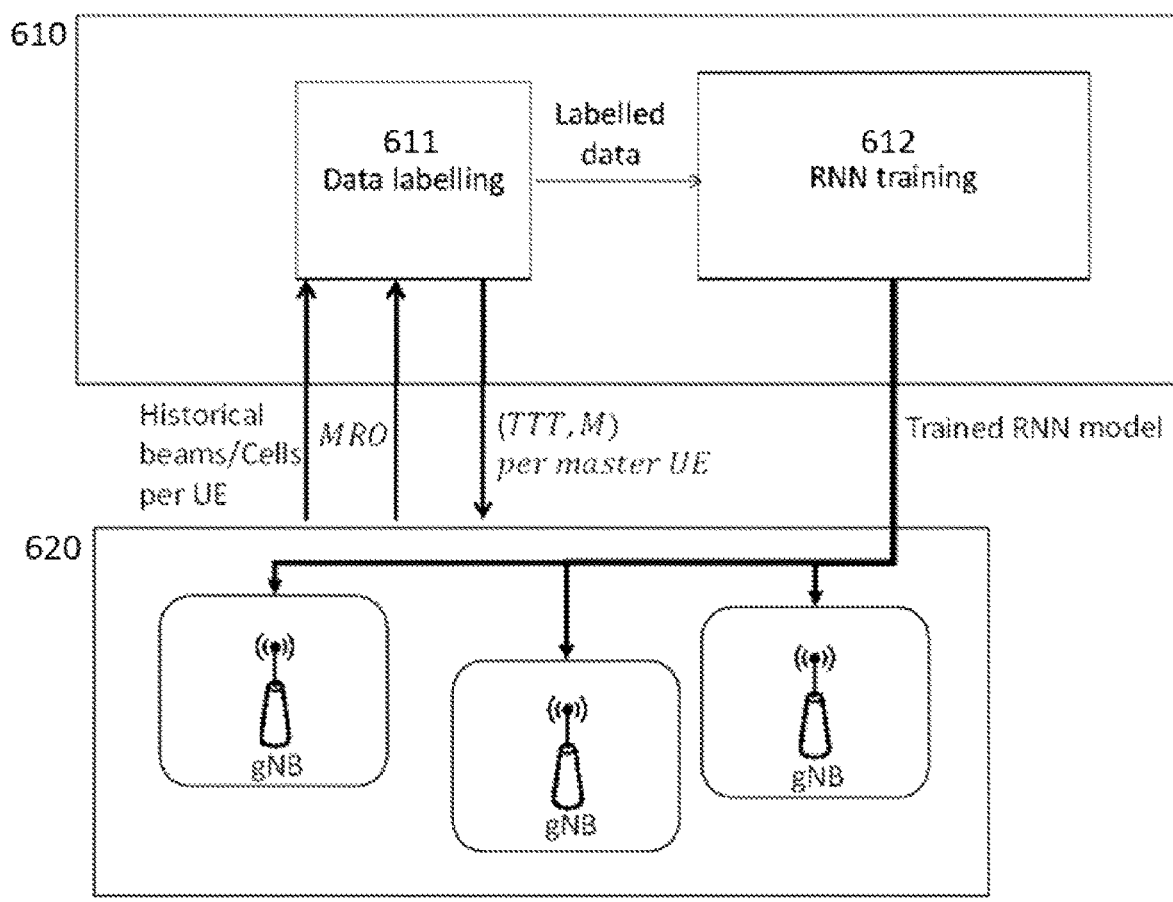
FIG. 6 illustrates a data labelling function and a recurrent neural network training function according to an exemplary embodiment.

FIG. 6 illustrates an exemplary embodiment comprising a data labelling function and an RNN training function. The data labelling and RNN training may be performed outside of a RAN 610 in an external platform 620. The external platform 620 may be for example a system such as a SON or a radio intelligent controller, RIC. The data labelling function 611 may exchange information with one or more base stations, for example gNBs, to obtain historical information of a plurality of terminal devices, as well as performance information when applying the selected subset of handover parameter values to a plurality of master terminal devices in order to determine the optimal handover parameter values for the plurality of terminal devices. The historical information may comprise a cell ID, a beam ID, and/or one or more measured RSRP values during a time interval per terminal device. The labelled dataset provided as output of the data labelling function may then be provided as input to the RNN training function 612. After the RNN has been trained with the labelled dataset, the trained RNN model may be provided, for example transmitted, to the one or more base stations, which in turn may use the trained RNN model to predict optimal handover parameter values for one or more terminal devices in real time based on the historical information of the one or more terminal devices.

Figure 7:
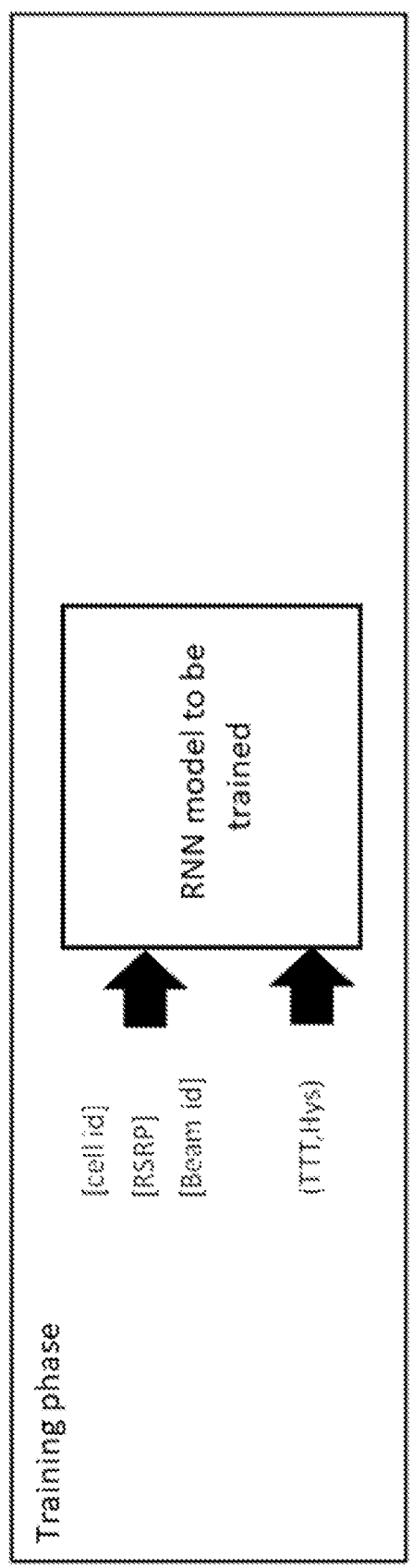
FIG. 7 illustrates a training phase for a recurrent neural network model according to an exemplary embodiment.

FIG. 7 illustrates a training phase for an RNN model according to an exemplary embodiment. In the training phase, the RNN model receives training data as input. The training data, i.e. the labelled dataset, may comprise historical information of a plurality of terminal devices, as well as the optimal handover parameter values for the plurality of terminal devices. The historical information may comprise a serving cell ID, a serving beam ID, and/or one or more measured RSRP values during a time interval per terminal device.

Figure 8:
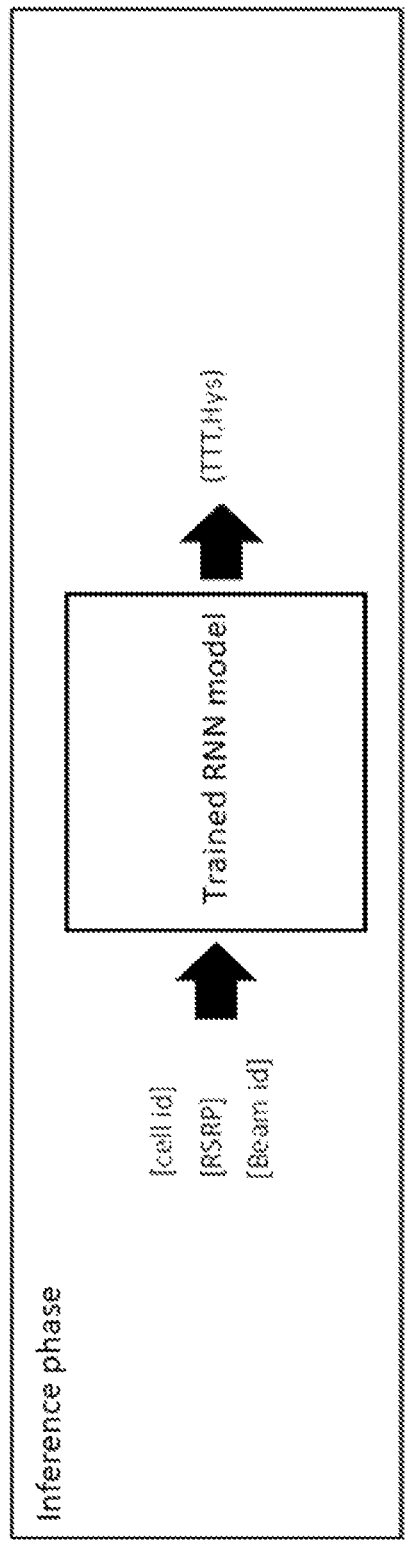
FIG. 8 illustrates an inference phase for a trained recurrent neural network model according to an exemplary embodiment.

FIG. 8 illustrates an inference phase for a trained RNN model according to an exemplary embodiment. After the RNN model has been trained, in the inference phase the trained RNN model receives as input historical information of one or more terminal devices, and predicts optimal handover parameter values, for example a TTT value and a hysteresis margin value, for the one or more terminal devices based on the historical information. The historical information may comprise a serving cell ID, a serving beam ID, and/or one or more measured RSRP values during a time interval per terminal device. It should be noted that these one or more terminal devices of the inference phase may be different terminal device(s) than the plurality of terminal devices that are used to train the RNN model in the RNN training phase.

Figure 9:
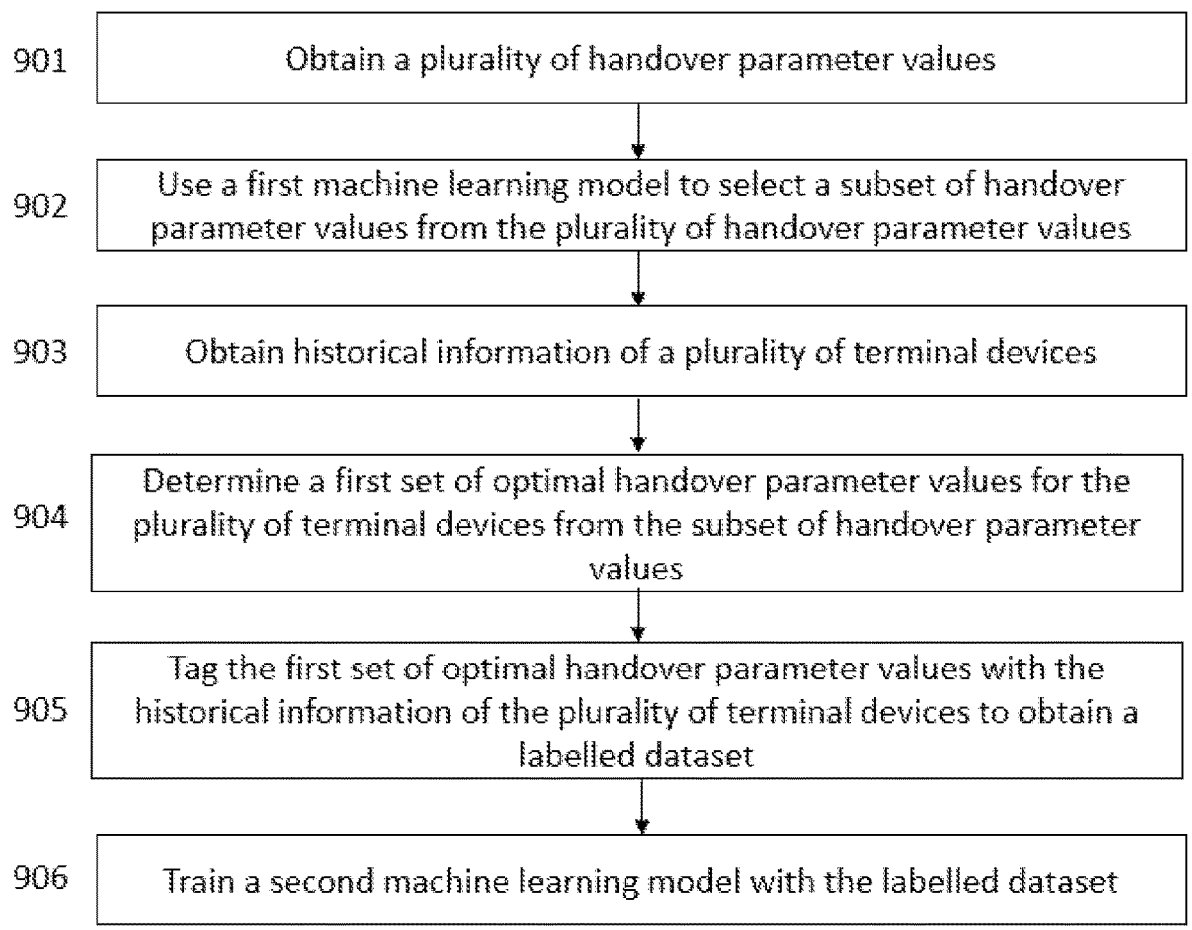
FIG. 9 illustrates a flow chart according to an exemplary embodiment.

FIG. 9 illustrates a flow chart according to an exemplary embodiment. In step 901, a plurality of handover parameter values is obtained. In step 902, a first machine learning model is used to select a subset of handover parameter values from the plurality of handover parameter values. In step 903, historical information of a plurality of terminal devices is obtained. In step 904, a first set of optimal handover parameter values for the plurality of terminal devices is determined from the subset of handover parameter values. In step 905, the first set of optimal handover parameter values is tagged with the historical information of the plurality of terminal devices to obtain a labelled dataset. In step 906, a second machine learning model is trained with the labelled dataset, wherein the second machine learning model may be trained, or taught, so that it is capable of predicting, or configured to predict, a second set of optimal handover parameter values for one or more other terminal devices, for example a first terminal device, based on historical information of the one or more other terminal devices. The one or more other terminal devices may not be comprised in the plurality of terminal devices that are used for training the second machine learning model.

The functionalities described above by means of FIG. 3-9 are in no absolute chronological order, and some of them may be performed simultaneously or in an order differing from the described one. Other functionalities may also be executed between them or within them, and other information may be transmitted and/or received.

In an exemplary embodiment, wherein no external platform is used, the training and/or inference may be performed at the CU level of the RAN. The required measurements, i.e. L2 information, may be transferred from DU to CU through F1 interface.

Figure 10:
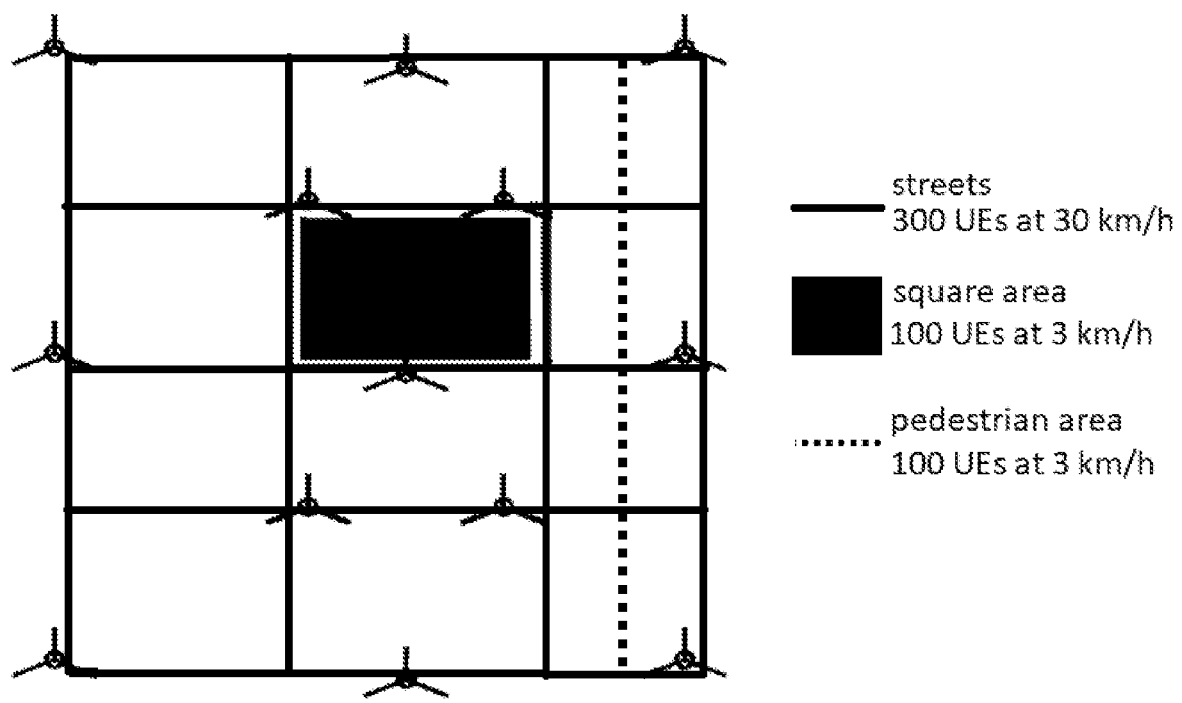
FIG. 10 illustrates a simulation scenario according to an exemplary embodiment.

FIG. 10 illustrates an outdoor simulation scenario according to an exemplary embodiment. Two types of users may be considered in the simulation: pedestrians walking on the pedestrian area and in the square area at 3 km/h, as well as cars driving on the streets at 30 km/h. The simulation parameters are summarized in Table 2 below.

TABLE 2

| Parameter | Value |
| --- | --- |
| Layer 3 filter coefficient | 8 |
| Threshold for beam consolidation | −120 dB |
| Measurement frequency | 0.2 s |
| Layer 1 sampling time | 0.2 s |
| Number of samples used in L1 filter | 2 |
| Beam sweeping period | 0.2 s |
| Layer 3 sampling rate | 0.2 s |
| gNB | 5G configuration with 32 beams per sector |

The DQN may be applied to different terminal device speed classes. Table 3 below shows a total of 45 possible states, i.e. a plurality of candidate handover parameter values, according to an exemplary embodiment. It may be possible to observe different groups of states. For example, state 1 may be adapted to users moving at a speed of over 70 km/h, state 2 to may be adapted to users moving at 50 km/h, and states 3 and 4 may be adapted to users moving at 30 km/h, whereas states 22 and 23 may represent the most relevant configurations to pedestrian users moving for example at a speed of 3 km/h. The converged states 1, 2, 3, 4, 22 and 23 (highlighted in bold) in Table 3 below may correspond to the subset of handover parameter values that are selected by the DQN from the plurality of candidate handover parameter values according to an exemplary embodiment.

TABLE 3

| | M = 1 dB | M = 2 dB | M = 3 dB | M = 4 dB | M = 5 dB | M = 6 dB | M = 7 dB | M = 8 dB | M = 9 dB |
| --- | --- | --- | --- | --- | --- | --- | --- | --- | --- |
| TTT = 0.1 s | 1 | 2 | 3 | 4 | 5 | 6 | 7 | 8 | 9 |
| TTT = 0.48 s | 10 | 11 | 12 | 13 | 14 | 15 | 16 | 17 | 18 |
| TTT = 0.64 s | 19 | 20 | 21 | 22 | 23 | 24 | 25 | 26 | 27 |
| TTT = 1.28 s | 28 | 29 | 30 | 31 | 32 | 33 | 34 | 35 | 36 |
| TTT = 2.56 s | 37 | 38 | 39 | 40 | 41 | 42 | 43 | 44 | 45 |

Figure 11:
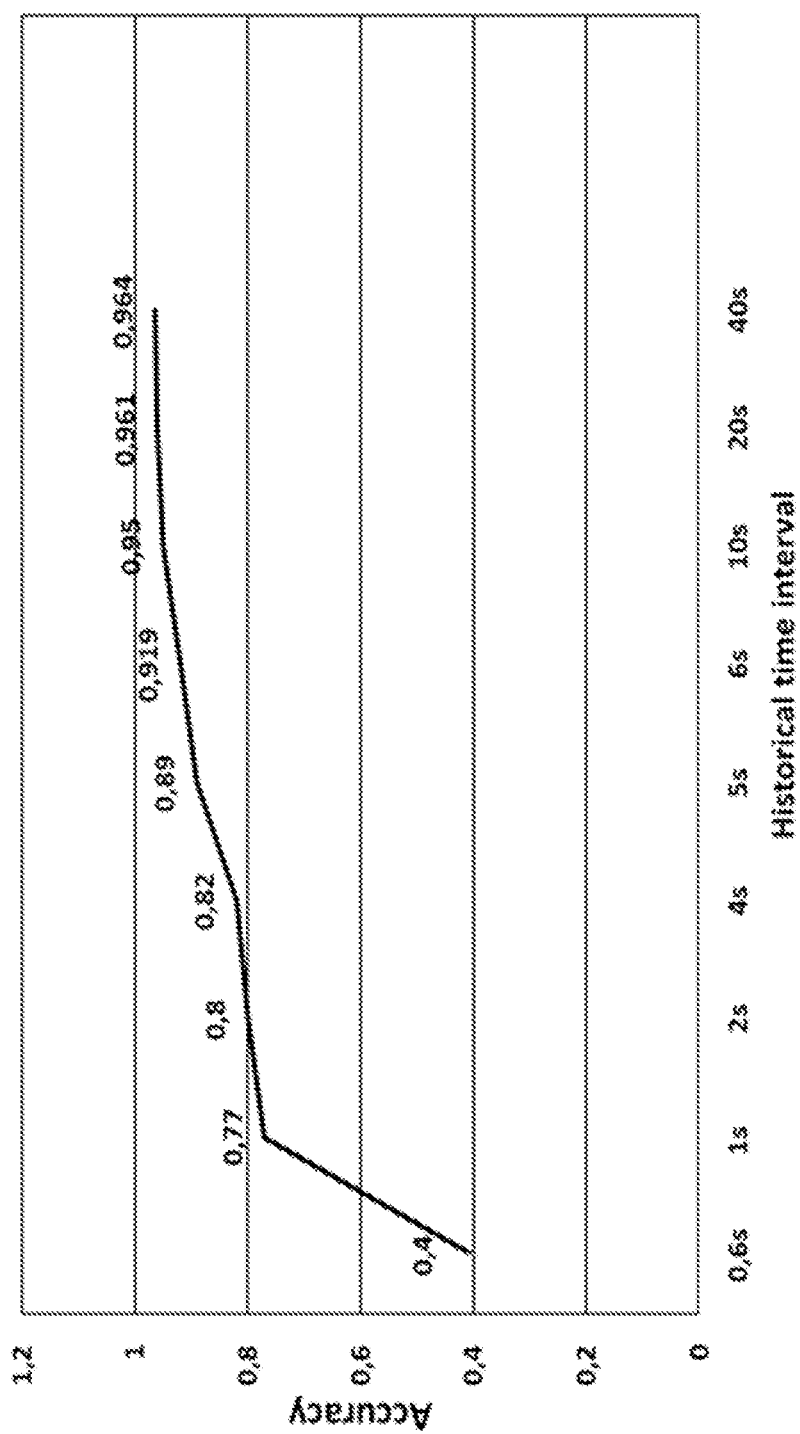
FIG. 11 illustrates test results according to an exemplary embodiment.

FIG. 11 illustrates test results according to an exemplary embodiment, wherein an RNN model is trained with 1100 terminal devices and tested with a different set of 500 terminal devices. FIG. 11 illustrates the accuracy of predictions made by the RNN model as a function of the historical time interval. Based on FIG. 11, it may be noted that the accuracy may increase as the historical time interval increases. On the other hand, however, it may be beneficial to keep the historical time interval as short as possible in order to simplify the implementation into a network, for example a 5G network. In this exemplary embodiment, this trade-off may be solved for example by selecting the historical time interval as 5 seconds or 6 seconds, which may result in approximately 90% accuracy according to FIG. 11.

Figure 12:
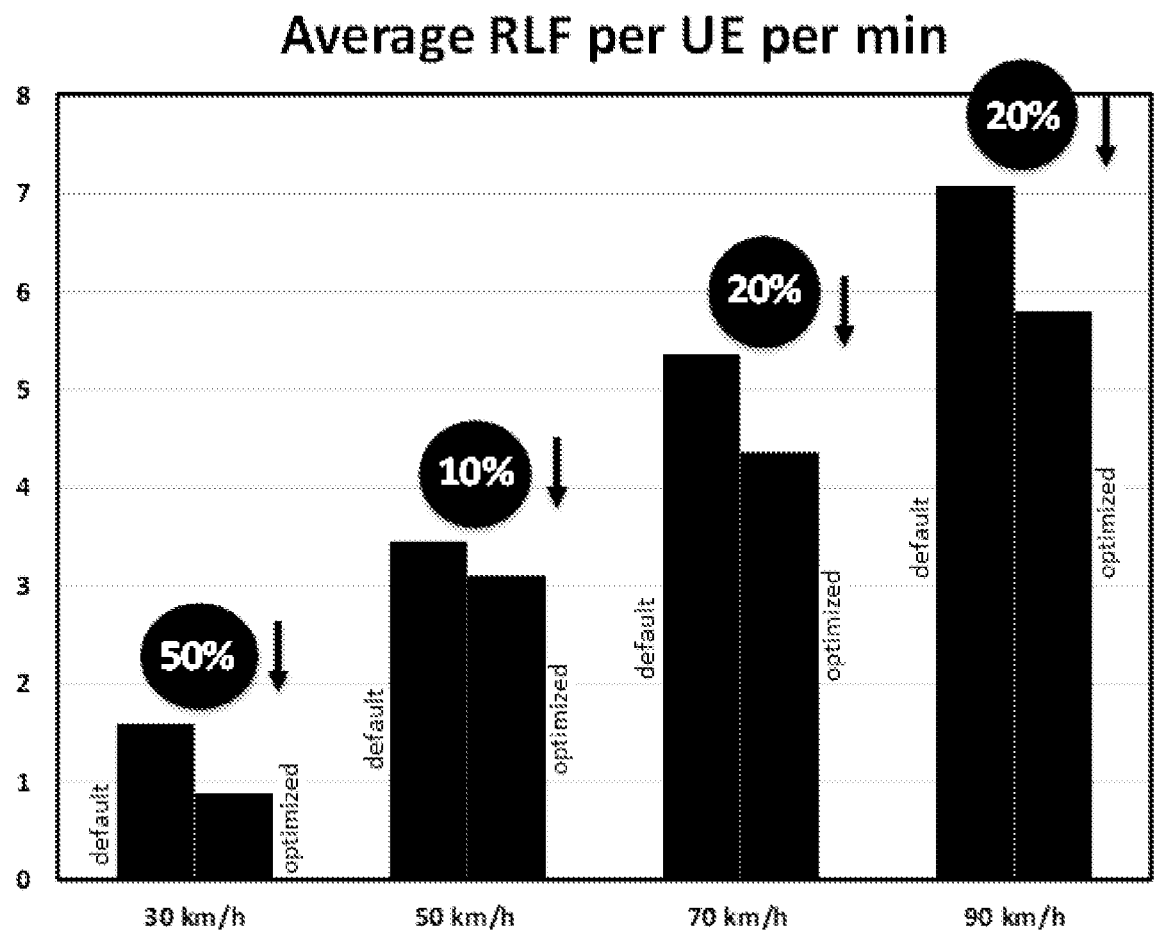
FIG. 12 illustrates test results according to an exemplary embodiment.

FIG. 12 illustrates test results for a comparison between using fixed handover parameter values and optimal handover parameter values obtained according to an exemplary embodiment. FIG. 12 illustrates average RLFs per terminal device per minute at different speeds of the terminal device. For example, in the case of a terminal device moving at a speed of 30 km/h, there may be an approximately 50% decrease in RLFs when using a machine learning based scheme according to an exemplary embodiment compared to a default configuration with fixed parameter values. The handover parameter values used in the comparison are summarized in Table 4 below.

TABLE 4

| Configuration | Handover parameter values |
| --- | --- |
| Default configuration (fixed parameter values at all speeds) | TTT = 0.48 s, M = 1 dB |
| Optimized configuration at 30 km/h | TTT = 0.1 s, M = 2 dB |
| Optimized configuration at 50 km/h | TTT = 0.1 s, M = 1 dB |
| Optimized configuration at 70 km/h | TTT = 0.1 s, M = 1 dB |
| Optimized configuration at 90 km/h | TTT = 0.1 s, M = 1 dB |

Figure 13:
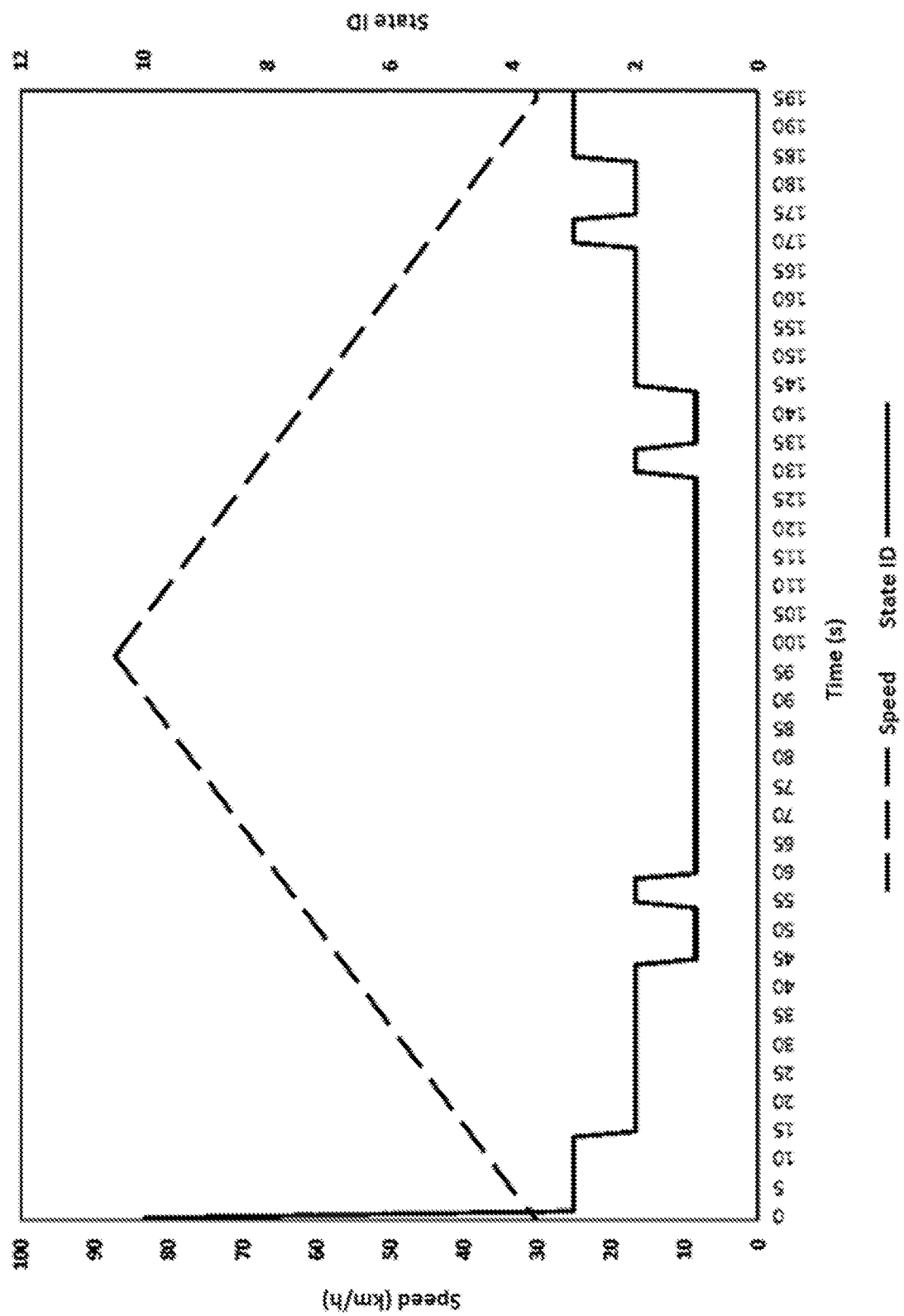
FIG. 13 illustrates performance of an exemplary embodiment.

FIG. 13 illustrates performance of an exemplary embodiment. More specifically, FIG. 13 shows an example of a varying speed profile, wherein the speed of a terminal device increases from 30 km/h to 85 km/h and then comes back to 30 km/h. The varying states, i.e. the handover parameter values depicted in Table 5 below, may be inferred as a function of time without relying on an explicit estimation of the speed of the terminal device. Thus, the exemplary embodiment may be able to detect changes in the speed of the terminal device and to adapt the handover parameters accordingly.

TABLE 5

| | TTT | hys |
| --- | --- | --- |
| State 1 | 0.1 s | 1 dB |
| State 2 | 0.1 s | 2 dB |
| State 3 | 0.1 s | 3 dB |

A technical advantage provided by some exemplary embodiments may be that they reduce the failure ratio associated with handover events. Furthermore, some exemplary embodiments may provide more efficient use of the resources of the network, as well as an improved user experience for a user of a terminal device.

Figure 14:
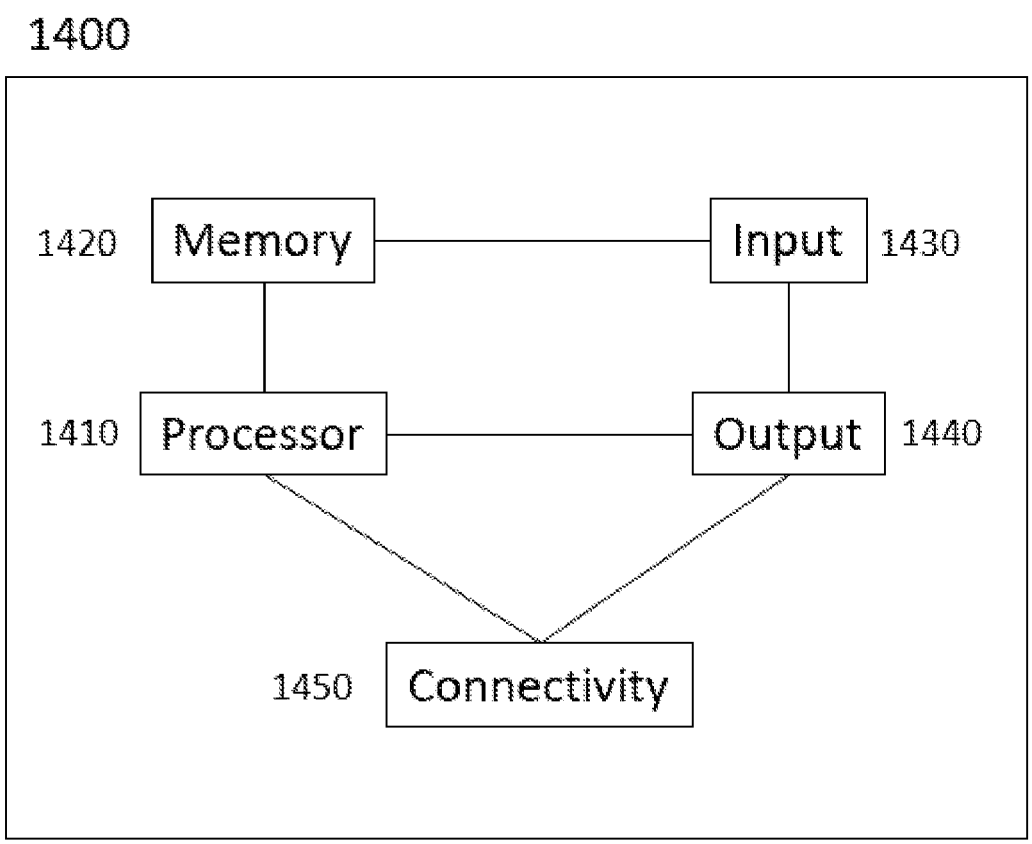
FIG. 14, FIG. 15 and FIG. 16 illustrate apparatuses according to exemplary embodiments.

FIG. 14 illustrates an apparatus 1400, which may be an apparatus such as, or comprised in, a terminal device, according to an exemplary embodiment. The apparatus 1400 comprises a processor 1410. The processor 1410 interprets computer program instructions and processes data. The processor 1410 may comprise one or more programmable processors. The processor 1410 may comprise programmable hardware with embedded firmware and may, alternatively or additionally, comprise one or more application specific integrated circuits, ASICs.

The processor 1410 is coupled to a memory 1420. The processor is configured to read and write data to and from the memory 1420. The memory 1420 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1420 stores computer readable instructions that are execute by the processor 1410. For example, non-volatile memory stores the computer readable instructions and the processor 1410 executes the instructions using volatile memory for temporary storage of data and/or instructions.

The computer readable instructions may have been pre-stored to the memory 1420 or, alternatively or additionally, they may be received, by the apparatus, via electromagnetic carrier signal and/or may be copied from a physical entity such as computer program product. Execution of the computer readable instructions causes the apparatus 1400 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 1400 further comprises, or is connected to, an input unit 1430. The input unit 1430 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 1430 may comprise an interface to which external devices may connect to. The apparatus 1400 may also comprise an output unit 1440. The output unit may comprise or be connected to one or more displays capable of rendering visual content such as a light emitting diode, LED, display, a liquid crystal display, LCD and a liquid crystal on silicon, LCoS, display.

The apparatus 1400 may further comprise a connectivity unit 1450. The connectivity unit 1450 enables wired and/or wireless connectivity to external networks. The connectivity unit 1450 may comprise one or more antennas and one or more receivers that may be integrated to the apparatus 1400 or the apparatus 1400 may be connected to. The connectivity unit 1450 may comprise an integrated circuit or a set of integrated circuits that provide the wireless communication capability for the apparatus 1400. Alternatively, the wireless connectivity may be a hardwired application specific integrated circuit, ASIC.

It is to be noted that the apparatus 1400 may further comprise various component not illustrated in FIG. 14. The various components may be hardware components and/or software components.

Figure 15:
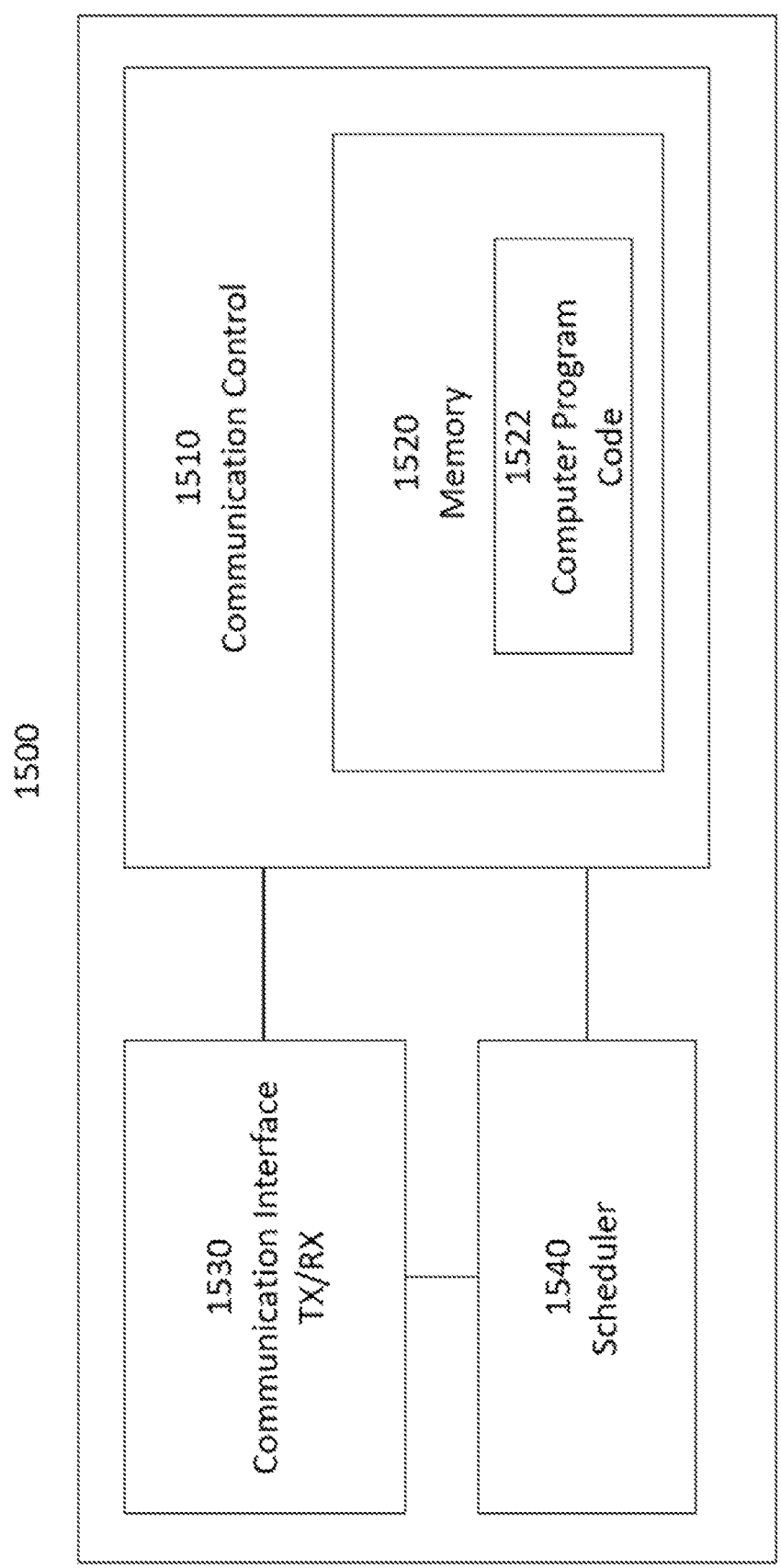

The apparatus 1500 of FIG. 15 illustrates an exemplary embodiment of an apparatus that may be a base station or be comprised in a base station. The apparatus may comprise, for example, a circuitry or a chipset applicable to a base station to realize the described exemplary embodiments. The apparatus 1500 may be an electronic device comprising one or more electronic circuitries. The apparatus 1500 may comprise a communication control circuitry 1510 such as at least one processor, and at least one memory 1520 including a computer program code (software) 1522 wherein the at least one memory and the computer program code (software) 1522 are configured, with the at least one processor, to cause the apparatus 1500 to carry out any one of the exemplary embodiments of the base station described above.

The memory 1520 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some exemplary embodiments, structures of the frames used in the detected neighbour cells.

The apparatus 1500 may further comprise a communication interface 1530 comprising hardware and/or software for realizing communication connectivity according to one or more communication protocols. The communication interface 1530 may provide the apparatus with radio communication capabilities to communicate in the cellular communication system. The communication interface may, for example, provide a radio interface to terminal devices. The apparatus 1500 may further comprise another interface towards a core network such as the network coordinator apparatus and/or to the access nodes of the cellular communication system. The apparatus 1500 may further comprise a scheduler 1540 that is configured to allocate resources.

Figure 16:
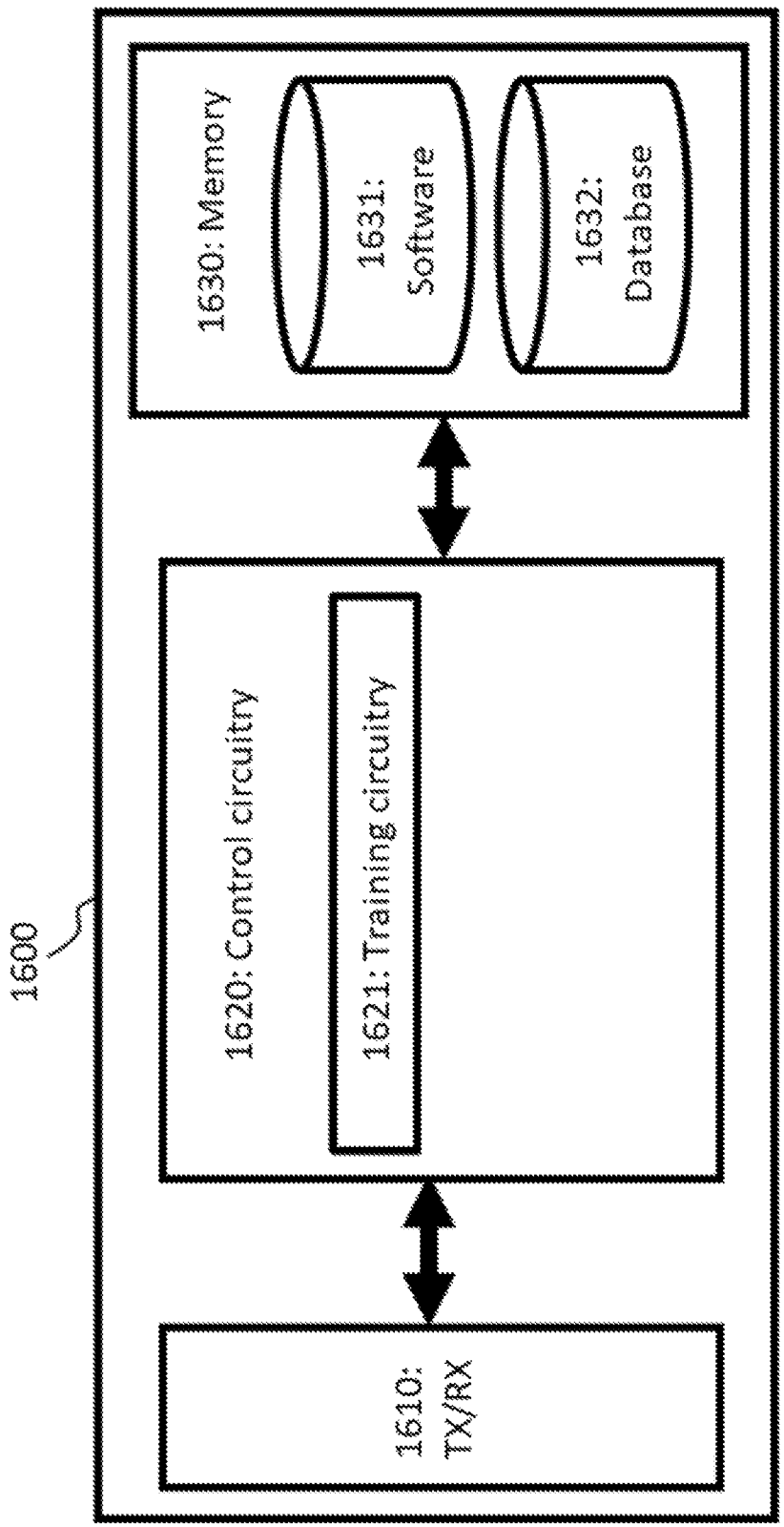

FIG. 16 illustrates an apparatus 1600, which may comprise or be comprised in a SON or a RIC or another network element or node, according to some exemplary embodiments. FIG. 16 may illustrate an apparatus configured to carry out at least the functionalities described in some exemplary embodiments in connection with training a first and/or a second machine learning model (for example a neural network based algorithm). The apparatus 1600 may comprise one or more control circuitry 1620, such as at least one processor, and at least one memory 1630, including one or more algorithms 1631, such as a computer program code (software) wherein the at least one memory and the computer program code (software) are configured, with the at least one processor, to cause, respectively, the apparatus to carry out any one of the exemplified functionalities of the (training) apparatus described above.

Referring to FIG. 16, the control circuitry 1620 of the apparatus may comprise at least training circuitry 1621. The training circuitry 1621 may be configured to carry out training of a machine learning model, for example of a neural network, according to some exemplary embodiments and, to this end, to carry out at least some of the functionalities described above by means of some exemplary embodiments using one or more individual circuitries.

The memory 1630 may comprise a database 1632 which may comprise, for example, historical information of a plurality of terminal devices and/or a plurality of handover parameter values to be used for training the machine learning model, for example parameters and topology of a neural network. The memory 1630 may also comprise other databases which may not be related to the functionalities of the apparatus according to any of the presented exemplary embodiments. The memory 1630 may be implemented using any suitable data storage technology, such as semiconductor based memory devices, flash memory, magnetic memory devices and systems, optical memory devices and systems, fixed memory and removable memory.

Referring to FIG. 16, the apparatus 1600 may further comprise one or more interfaces 1610 such as one or more communication interfaces (transmitter/receiver, TX/RX)

comprising hardware and/or software for realizing communication connectivity over one or more transmission media according to one or more communication protocols. Specifically, the communication interface 1610 for the apparatus 1600 may provide the apparatus with communication capabilities to communicate in a wireless communication system and enable communication with one or more base stations, one or more terminal devices (possibly via said plurality of base stations) and/or one or more other network nodes or elements. The communication interface 1610 may enable the apparatus 1600 to transfer a trained machine learning model for example to one or more base stations for predicting optimal handover parameter values for one or more terminal devices using said trained machine learning model.

As used in this application, the term "circuitry" may refer to one or more or all of the following:
a. hardware-only circuit implementations (such as implementations in only analog and/or digital circuitry) and
b. combinations of hardware circuits and software, such as (as applicable):
   i. a combination of analog and/or digital hardware circuit(s) with software/firmware and
   ii. any portions of hardware processor(s) with software (including digital signal processor(s)), software, and memory(ies) that work together to cause an apparatus, such as a mobile phone, to perform various functions) and
c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
at least one processor; and
at least one memory including computer program code, wherein the at least one memory and the computer program code are configured, with the at least one processor, to cause the apparatus to:
obtain a plurality of handover parameter values;
use a first machine learning model to select a subset of handover parameter values from the plurality of handover parameter values;
obtain historical information of a plurality of first terminal devices;
determine a first set of optimal handover parameter values for the plurality of first terminal devices from the subset of handover parameter values;
tag the first set of optimal handover parameter values with the historical information of the plurality of first terminal devices to obtain a labelled dataset; and
train a second machine learning model with the labelled dataset, wherein the trained second machine learning model is capable of predicting a second set of optimal handover parameter values for a second terminal device based on historical information of the second terminal device.

2. The apparatus according to claim 1, wherein the at least one memory and computer program code are further configured, with the at least one processor, to cause the apparatus to provide the trained second machine learning model to one or more base stations.

3. The apparatus according to claim 1, wherein the handover parameter values comprise values representing at least one of hysteresis margin and time-to-trigger.

4. The apparatus according to claim 1, wherein the historical information comprises a cell ID, a beam ID, or a reference signal received power value.

5. The apparatus according to claim 1, wherein the first set of optimal handover parameter values is determined by testing the subset of handover parameter values with at least a subset of the plurality of first terminal devices and selecting a set of handover parameter values that maximize a performance indicator of the at least subset of the plurality of first terminal devices.

6. The apparatus according to claim 1, wherein the first set of optimal handover parameter values is determined by simulating the subset of handover parameter values with the plurality of first terminal devices and selecting a set of handover parameter values that maximize a performance indicator of the plurality of first terminal devices based on the simulation.

7. The apparatus according to claim 1, wherein the apparatus comprises a device in a self-organizing network or a radio intelligent controller.

8. A system comprising one or more apparatuses, wherein the system is configured to:

obtain a plurality of handover parameter values;
use a first machine learning model to select a subset of handover parameter values from the plurality of handover parameter values;
obtain historical information of a plurality of first terminal devices;
determine a first set of optimal handover parameter values for the plurality of first terminal devices from the subset of handover parameter values;
tag the first set of optimal handover parameter values with the historical information of the plurality of first terminal devices to obtain a labelled dataset; and
train a second machine learning model with the labelled dataset, wherein the trained second machine learning model is capable of predicting a second set of optimal handover parameter values for a second terminal device based on historical information of the second terminal device.

9. The system according to claim 8, further comprising providing the trained second machine learning model to one or more base stations.

10. The system according to claim 8, wherein the handover parameter values comprise values representing at least one of hysteresis margin and time-to-trigger.

11. The system according to claim 8, wherein the historical information comprises a cell ID, a beam ID, or a reference signal received power value.

12. The system according to claim 8, wherein the first set of optimal handover parameter values is determined by testing the subset of handover parameter values with at least a subset of the plurality of first terminal devices and selecting a set of handover parameter values that maximize a performance indicator of the at least subset of the plurality of first terminal devices.

13. The system according to claim 8, wherein one of the apparatuses comprises a device in a self-organizing network or a radio intelligent controller.

14. The system according to claim 8, wherein the first set of optimal handover parameter values is determined by simulating the subset of handover parameter values with the plurality of first terminal devices and selecting a set of handover parameter values that maximize a performance indicator of the plurality of first terminal devices based on the simulation.

15. A method, comprising:
obtaining a plurality of handover parameter values;
using a first machine learning model to select a subset of handover parameter values from the plurality of handover parameter values;
obtaining historical information of a plurality of first terminal devices;
determining a first set of optimal handover parameter values for the plurality of first terminal devices from the subset of handover parameter values;
tagging the first set of optimal handover parameter values with the historical information of the plurality of first terminal devices to obtain a labelled dataset; and
training a second machine learning model with the labelled dataset, wherein the trained second machine learning model is capable of predicting a second set of optimal handover parameter values for a second terminal device based on historical information of the second terminal device.

16. The method according to claim 15, further comprising providing the trained second machine learning model to one or more base stations.

17. The method according to claim 15, wherein the handover parameter values comprise values representing at least one of hysteresis margin and time-to-trigger.

18. The method according to claim 15, wherein the historical information comprises a cell ID, a beam ID, or a reference signal received power value.

19. The method according to claim 15, wherein the first set of optimal handover parameter values is determined by testing the subset of handover parameter values with at least a subset of the plurality of first terminal devices and selecting a set of handover parameter values that maximize a performance indicator of the at least subset of the plurality of first terminal devices.

20. The method according to claim 15, wherein the first set of optimal handover parameter values is determined by simulating the subset of handover parameter values with the plurality of first terminal devices and selecting a set of handover parameter values that maximize a performance indicator of the plurality of first terminal devices based on the simulation.

* * * * *